J. STEPHEN.

Cooking Stove.

No. 67,603.

Patented Aug. 6, 1867.

WITNESSES:

INVENTOR:

United States Patent Office

JOHN STEPHEN, OF WOMELSDORF, PENNSYLVANIA.

Letters Patent No. 67,603, dated August 6, 1867.

POT-HOLE LID FOR COOKING-STOVES.

*The Schedule referred to in these Letters Patent and making part of the same.*

TO ALL WHOM IT MAY CONCERN:

Be it known that I, JOHN STEPHEN, of Womelsdorf, in the county of Berks, and in the State of Pennsylvania, have invented certain new and useful improvements in Stove-Lids; and do hereby declare that the following is a full, clear, and exact description thereof, reference being had to the accompanying drawings, and to the letters of reference marked thereon, making a part of this specification.

My invention consists in forming a stove-lid in concavo-convex shape, and providing the same with a damper.

In the annexed drawings, A represents the stove-lid, which is made in the above form, having a flange, $c\,c$, around the circumference for placing it upon the stove. This lid is provided with a series of openings, $t\,t$, which may be either open or closed by means of the damper-plate $A'$. This damper-plate is of the usual form used in stove pipes, or for air-passages, but made in the concavo-convex shape, to correspond with the lid A, and is connected thereto by the button X. $a$ represents a slot cut in the flange of the lid, into which rests the handle $b$, which is secured to the damper-plate, and by which means the same is operated to open or close the spaces $t\,t$.

Figure 1:
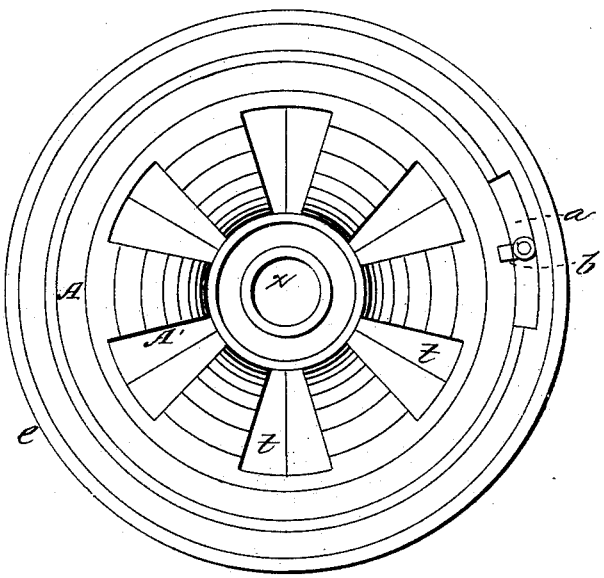
Figure 2:
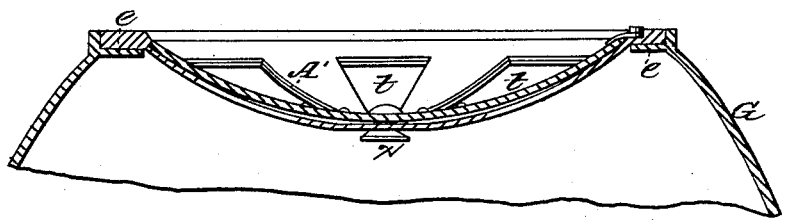

This lid is designed for use on cooking-stoves, and is so placed, as seen in Figure 2, that its convexity is beneath the surface of the stove, where it is held by means of its flange. The upper face of the lid being concave, many articles and utensils may be placed upon it or within it, and it can be used with the damper either open or closed, so that it is not necessary to extract the lid from the stove unless desired, thus regulating the flow of heat to the utensil placed upon it.

Having thus fully described my invention, what I claim, and desire to secure by Letters Patent, is—

The use of the lid A, concave at its top and convex at the bottom, with its damper-plate $A'$, and circumferential flange $e$, with the stove G, in the manner as specified.

In testimony that I claim the foregoing I have hereunto set my hand this 12th day of April, 1867.

JNO. STEPHEN.

Witnesses:
    JOSEPH SMITH,
    M. T. SEIBERT.